United States Patent [19]
Barre

[11] 3,915,286
[45] Oct. 28, 1975

[54] APPARATUS FOR SERVING A HEAPED STOCK OF PRODUCT

[76] Inventor: Marcel Jean Charles Barre, Residence du Champ de Course, 250 Chaussee Jules Cesar, 95600 Eaubonne, France

[22] Filed: Apr. 5, 1974

[21] Appl. No.: 458,374

[30] Foreign Application Priority Data
Apr. 16, 1973 France .............................. 73.13637

[52] U.S. Cl. .................................. 198/36; 214/10
[51] Int. Cl.² ............................................. B65G 63/00
[58] Field of Search ............ 214/10; 198/88, 89, 93, 198/96, 101, 103, 211, 36; 37/190

[56] References Cited
UNITED STATES PATENTS

| | | | |
|---|---|---|---|
| 3,015,175 | 1/1962 | Smith | 198/88 X |
| 3,062,392 | 11/1962 | Eppard | 198/96 X |
| 3,306,476 | 2/1967 | McMillan | 214/10 |
| 3,334,759 | 8/1967 | Ludwig | 214/10 |

FOREIGN PATENTS OR APPLICATIONS

| | | | |
|---|---|---|---|
| 1,168,747 | 10/1969 | United Kingdom | 214/10 |
| 723,851 | 1/1932 | France | 214/10 |
| 1,154,772 | 6/1969 | United Kingdom | 214/10 |

*Primary Examiner*—Frank E. Werner
*Attorney, Agent, or Firm*—Sughrue, Rothwell, Mion, Zinn & Macpeak

[57] ABSTRACT

The apparatus comprises a gantry which is movable across the stock and on which a scooping wheel for scooping the stock is rotatably mounted through a carriage which is movable along the gantry. The gantry has an elongate framework. The wheel is contained in a plane which is perpendicular to the centre longitudinal axis of the framework and surrounds the framework in said plane. The axis of rotation of the wheel is offset with respect to the centre axis of the framework which has a cross section inscribed in a rectangle located in the upper part of the wheel.

11 Claims, 23 Drawing Figures

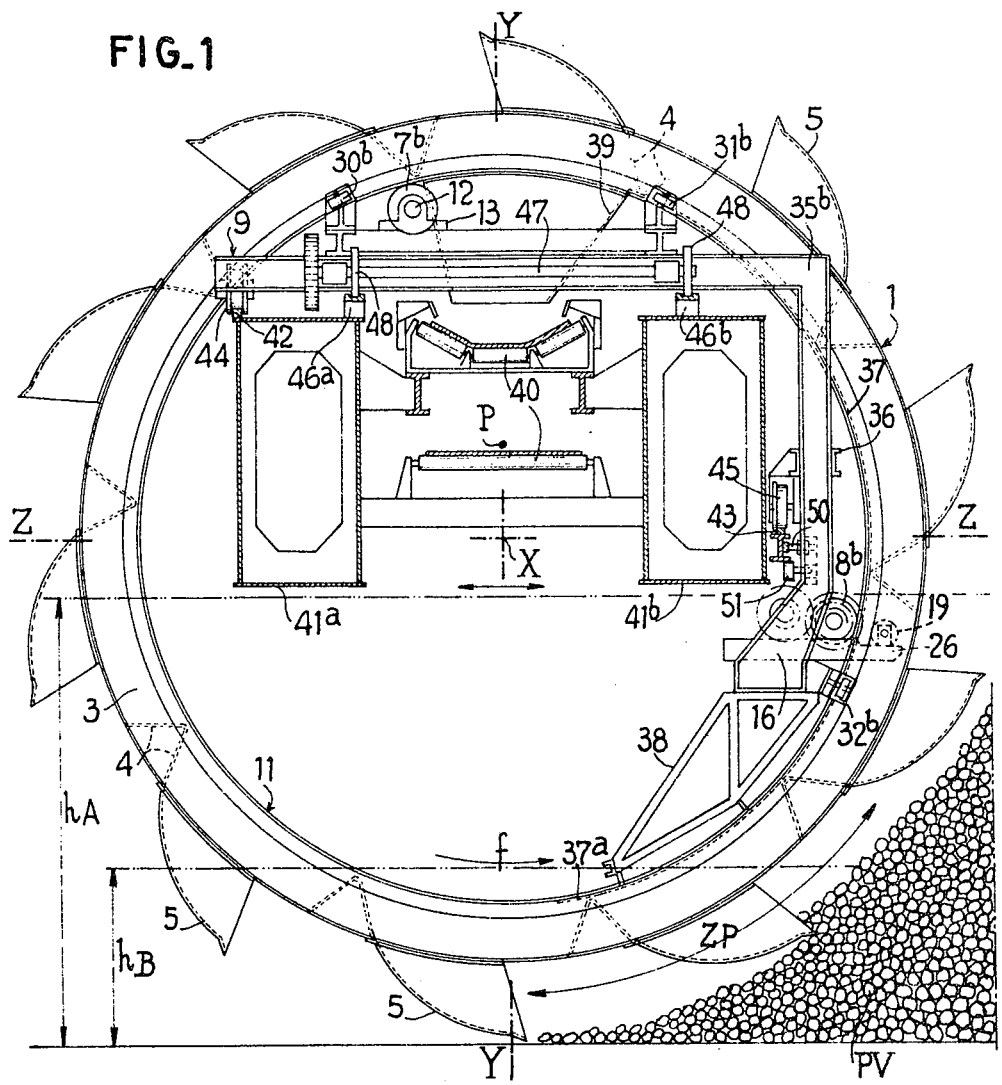
FIG_1
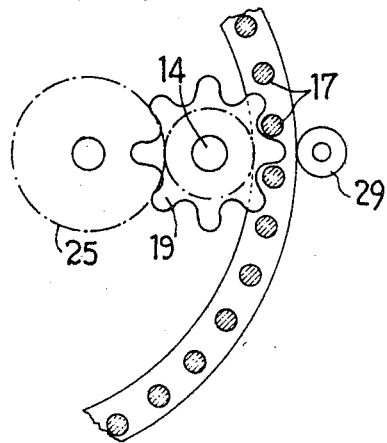
FIG_4

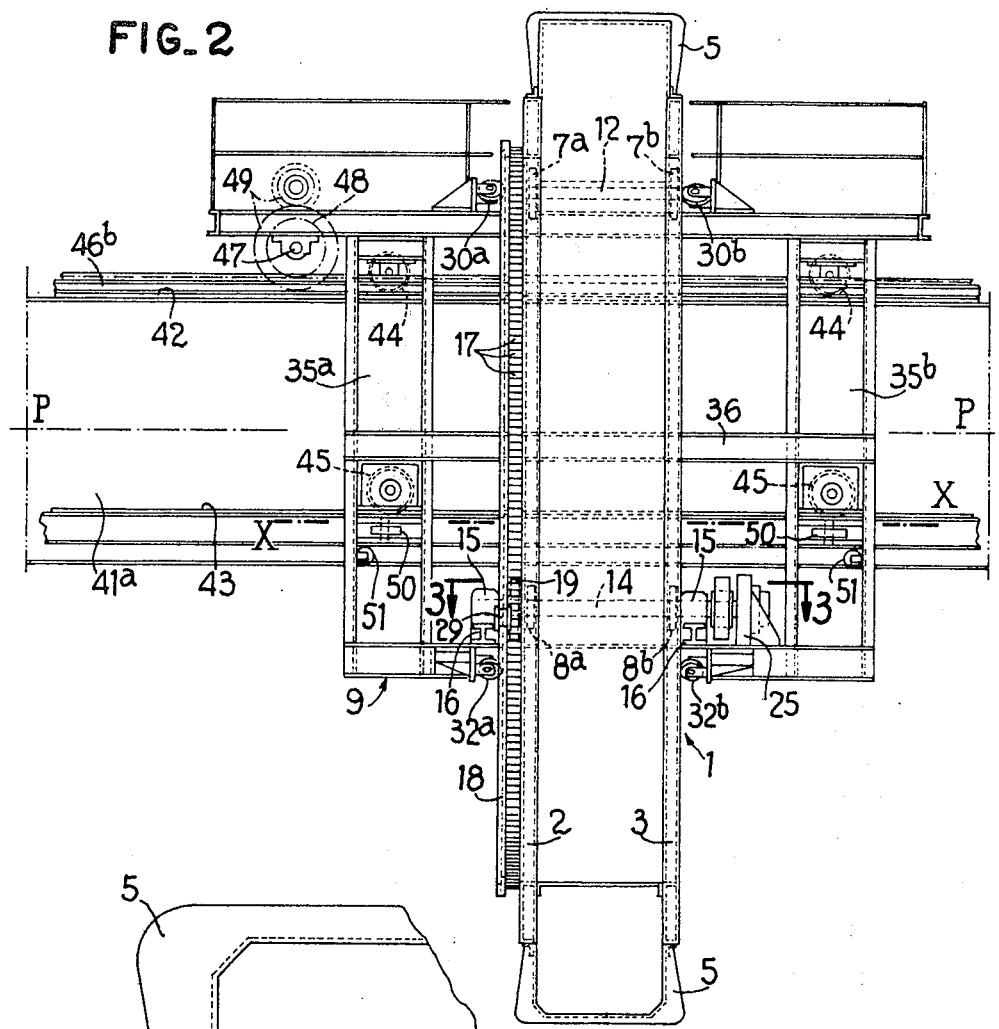
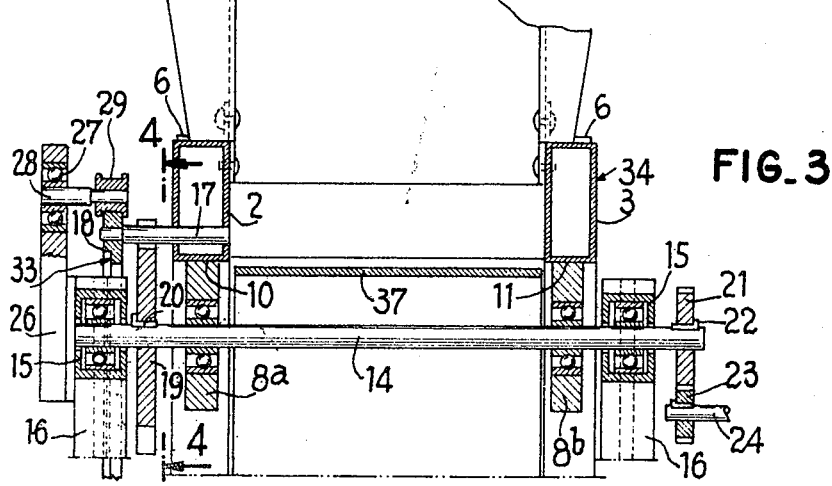

FIG._7
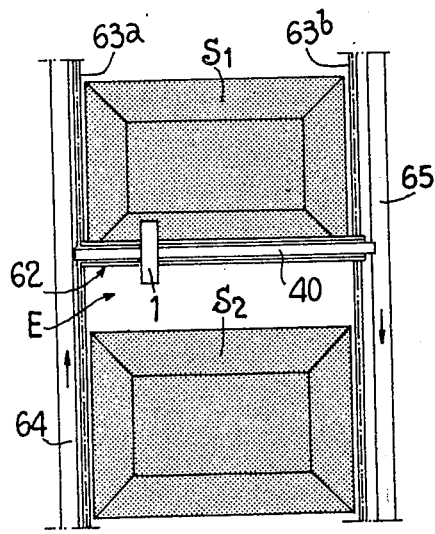
FIG._10
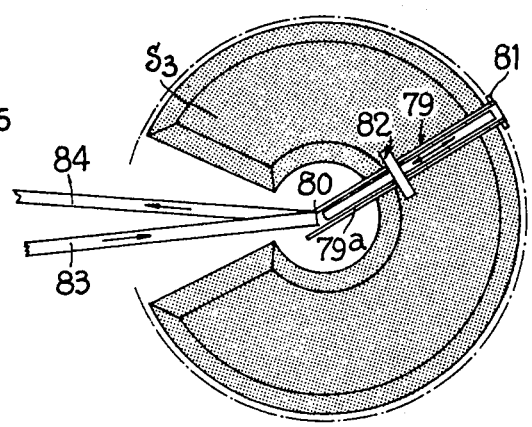

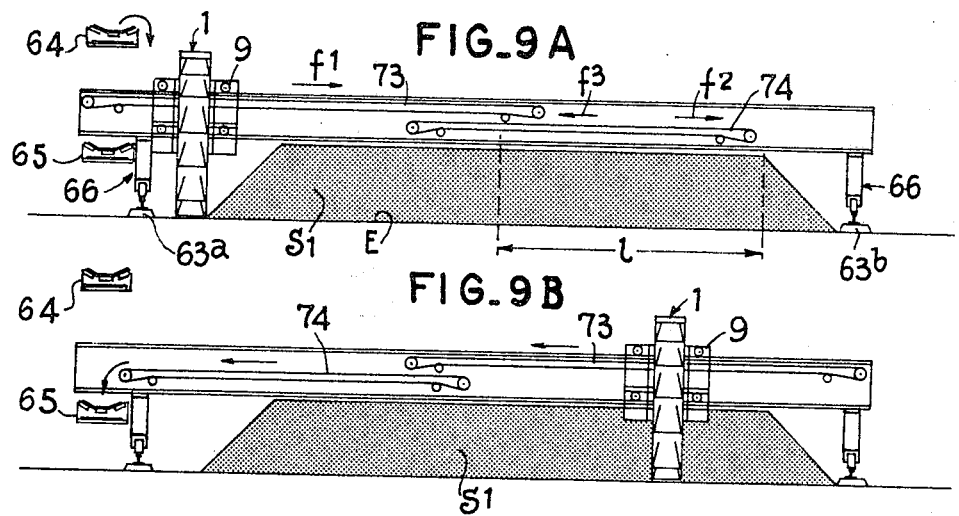
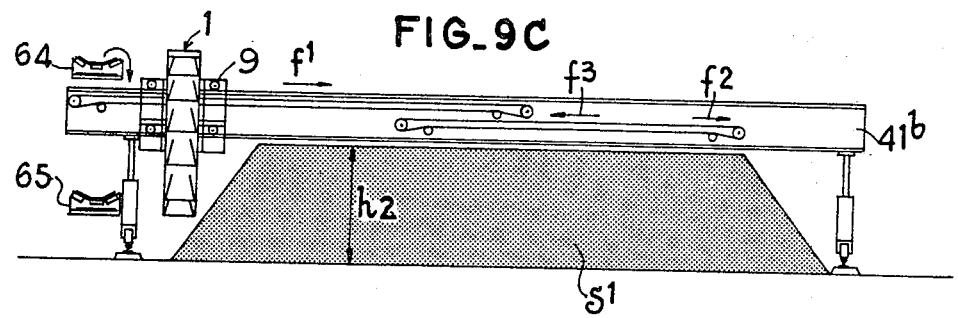
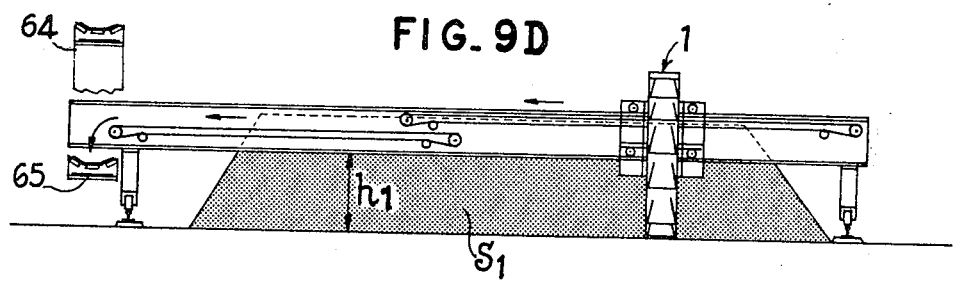
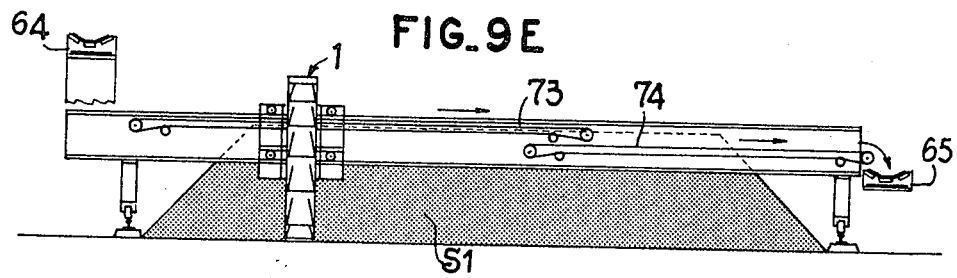

FIG._13
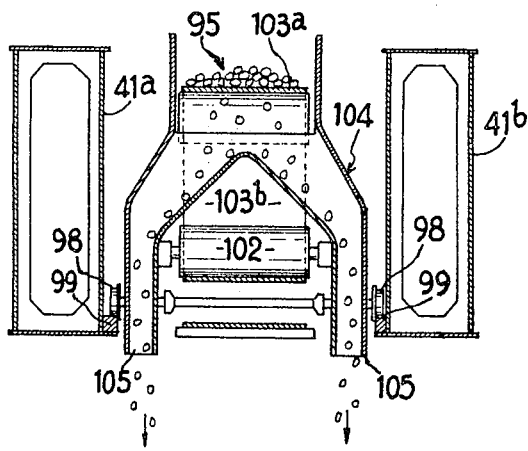
FIG._16 A
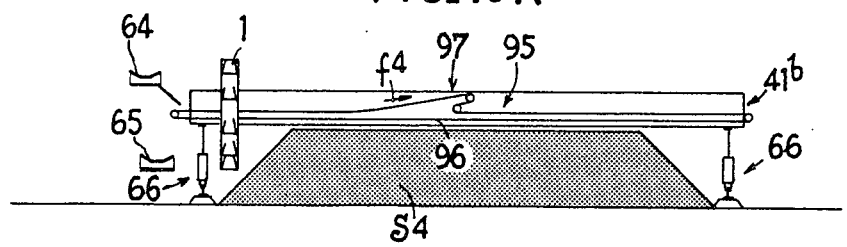
FIG._16 B
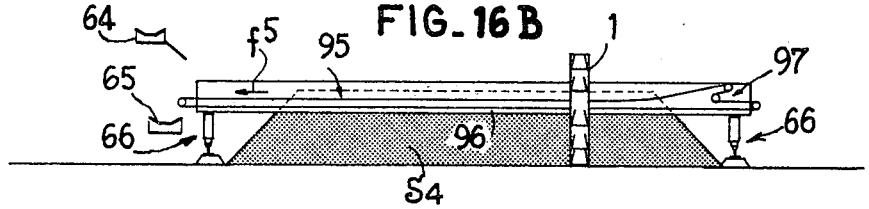
FIG._16 C
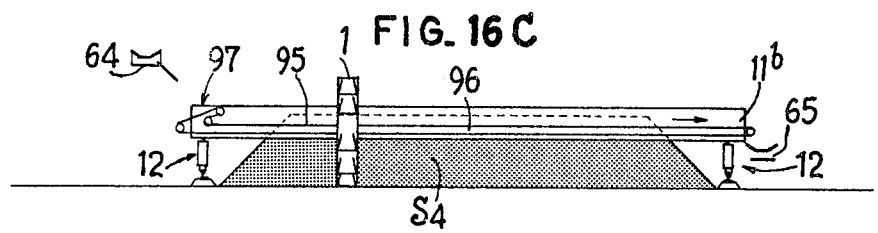

APPARATUS FOR SERVING A HEAPED STOCK OF PRODUCT

The present invention relates to an apparatus for serving a heaped stock of product, such as beets, coal, ore and the like. More particularly, an object of the invention is to provide such an apparatus which permits not only stocking the product but also withdrawing the product from the stock by means of a single mechanical unit.

Heretofore, the serving of a heaped stock of product, that is to say, the supply of product to the stock and the withdrawal of product from the stock, has usually been achieved by means of an apparatus comprising:

Firstly, a first travelling gantry which moves in front of the end face of the stock and includes a conveyor on which product can be poured by a rotary scooping wheel which is mounted on the gantry to move in translation; this unit can thus take product from the stock and pour it onto a product discharging conveyor.

Secondly, a second gantry which is also movable in translation over the region of the stock and includes a set of endless conveyors for distributing the product, by means of a device feeding the product to be stocked, throughout the surface of the stock.

In these known apparatus, the first travelling gantry and the scooping wheel can, in order to withdraw product from the stock, work on one of the faces of the latter and advance progressively as the stock is consumed. Consequently, the gantry which carries the scooping wheel cannot move freely since its path is encumbered by the stock itself. Consequently, the stock must be consumed wholly before a new stock can be constituted in the same region, since often the wheel is operative in only one direction and the direction of movement of the gantry cannot be reversed to operate on a newly-constituted stock.

There is a solution to this problem which comprises providing a transporter bridge on one side of the stock so that, after having consumed the old stock, the gantry and its scooping wheel can be returned to the front face of the new stock so as to permit the removal of product from the new stock. However, this solution is unsatisfactory since a transporting bridge disposed parallel to the region of the stock is very costly and is moreover employed but little, bearing in mind the total working time of the apparatus.

Further, it often happens that it is desired to stock products of different types or of particular qualities, and, in this case, a plurality of gantries with their associated wheels must be employed which also entails a considerable increase in the cost of the apparatus.

The drawbacks of conventional apparatus are due in particular to the fact that the gantry around which the wheel is mounted has such overall size that the assembly cannot be passed over the stock unless of course the height of the stock is reduced to a very low value. However, as the scooping wheel must of necessity be capable of scooping up the product near to the ground, the gantry must extend to a height which is usually less than 2 metres which would result in a constitution of stock of an excessively low height if it is desired to pass the assembly over the stock. Further, if a great height is chosen for the stock, the wheel is liable to hollow out a cavity in the front face of the stock from which it is in process of removing product and, under these conditions, the upper part of the stock is liable to collapse and run down onto the wheel and bury the latter. To preclude this from happening, a harrow is provided above the wheel which bears on the inclined front face of the stock. This harrow protects the wheel and is adapted to cause the product to run down to the foot of the wheel as the wheel carries out its scooping function.

It will be clear that such an arrangement also considerably increases the cost of the apparatus.

An object of the present invention is to overcome the drawbacks of known apparatus.

The invention provides an apparatus for serving a heaped stock of product, comprising a gantry having a horizontal framework, and an annular scooping wheel which is mounted to extend around the framework in a plane perpendicular to the axis of said framework by a carriage for shifting the wheel in translation with respect to the framework, wherein the axis of said wheel is offset with respect to the axis of said framework and the cross section of the framework is inscribed in a rectangle which is disposed in the upper part of said wheel.

Owing to these features, the lower part of the scooping wheel is entirely free so that the gantry is free to pass over and above the region of the stock to be served when the wheel is parked to one side of the stock whereas the wheel is capable of working on the stock throughout the height of the latter.

According to another feature of the invention, conveyor means are mounted in said horizontal framework, these means communicating with, on one hand, means for supplying product to the stock and, on the other hand, means for discharging product from the stock.

These features enable the same gantry to be employed for supplying product to, or discharging product from, the stock.

Further features and advantages of the invention will be apparent from the ensuing description with reference to the accompanying drawings.

In the drawings:

FIG. 1 is a cross-sectional view of an apparatus according to the invention, the scooping wheel being shown in elevation;

FIG. 2 is a side elevational view of the scooping wheel shown in FIG. 1;

FIG. 3 is a partial horizontal sectional view, to an enlarged scale and taken on line 3—3 of FIG. 2, of the device for driving the wheel shown in FIG. 1;

FIG. 4 is a view of a detail of the wheel-driving device;

FIG. 7 is a diagrammatic plan view of an apparatus for serving a heaped stock of products according to the invention;

FIGS. 9A to 9E are diagrammatic elevational views of the apparatus according to the invention illustrating the operation of the apparatus;

FIG. 10 is a diagrammatic plan view of a modification of the apparatus according to the invention;

FIG. 13 is a cross-sectional view of a gantry framework according to a modification of the invention;

FIGS. 16A to 16C are diagrammatic views of the modification of the apparatus shown in FIGS. 13 to 15.

Figure 6:
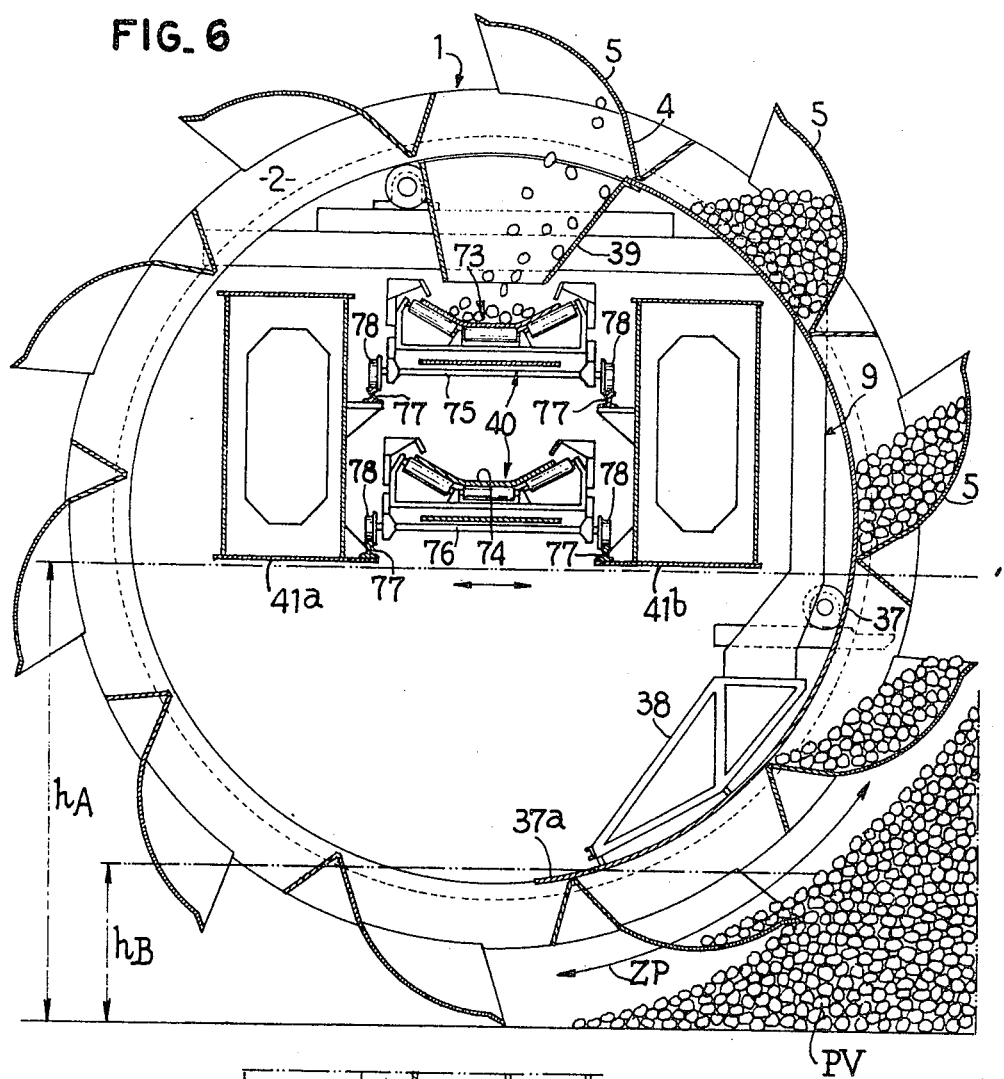
FIG. 6 is an elevational view of a scooping wheel and a cross-sectional view of a framework in which conveyor means are mounted.

In the embodiment of the invention shown in FIGS. 1 to 5, a scooping wheel 1 comprises two coaxial rings 2 and 3 of identical diameter constructed preferably from welded and stiffened steel sheets. For example, these rings 2 and 3 have an inside diameter of several metres, for example 8 metres.

The rings 2 and 3 which are rotatable about a horizontal axis X—X passing through the centre of gravity of the wheel are strongly braced by steel plates 4 which maintain the rings 2 and 3 in two vertical planes.

The rings 2 and 3 are constituted preferably from annular box structures having a constant rectangular section (see FIG. 3 in particular).

Product-scooping scoops or buckets 5 of conventional shape are mounted in spaced relation on the rings 2 and 3 by fastening means 6 (FIG. 3) so as to be capable of scooping product from a heap PV of product when the scooping wheel 1 rotates in the direction of arrow $f$ (FIG. 1).

The scooping wheel bears against a pair of upper rollers 7a, 7b and a pair of lower rollers 8a, 8b. These pairs of rollers are rotatably mounted on a support carriage 9 which will be described in more detail herinafter.

The rollers 7a, 7b, 8a, 8b have horizontal axes and cylindrical rolling surfaces in permanent contact with runway surfaces 10 and 11 (FIG. 3) constituted by the inner peripheral surfaces of the rings 2 and 3.

The rollers 7a and 7b are mounted on a horizontal shaft 12 which is journalled in bearings 13 (one of which is shown in FIG. 1) which are located on each side of the wheel 1 and mounted on the support carriage 9.

The rollers 8a and 8b are freely rotatable on a horizontal shaft 14 journalled in bearings 15 which are located on each side of the wheel 1 and mounted on horizontally extending fittings 16 rigidly secured to the support carriage 9.

Horizontal rods 17 are fixed to the ring 2 in spaced relation in the manner of bars of a squirrel cage. The ends of the rods 17 remote from the ring 2 are fixed in an annular member 18 which is coaxial with the rings 2 and 3 and adapted to stiffen the assembly formed by the rods 17. The latter engage a gear 19 keyed on the shaft 14 by a key 20. This shaft carries at its other end a gear 21 which is keyed thereon by a key 22 and meshes with a drive gear 23 which is connected to rotate with a drive shaft 24 driven by a motor-speed reducer unit 25 which may be hydraulic, electrical or of some other type (FIGS. 2 and 3).

A support element 26 is fixed to the fitting 16 on the side of the wheel on which the rods 17 are located (FIGS. 1 and 3) and supports at its free end a bearing 27 in which a shaft 28 is journalled. The latter carries at its free end a counter-roller 29 which is in contact with the outer surface of the annular member 18. The counter-roller is adapted to prevent any raising of the wheel 1 under the effect of the force produced by the meshing of the gear 19 with the rods 17.

The scooping wheel is maintained laterally by a pair of rollers 30a, 30b, 31a, 31b, 32a, 32b, the axes of which are perpendicular to and intersect the axis X—X of the wheel. The rollers 30a, 31a, 32a roll along a lateral runway surface 33 (FIG. 3) formed on the member 18 whereas the rollers 30b, 31b and 32b are in contact with the outer lateral surface 34 of the ring 3. These rollers are freely rotatable on suitable bearings mounted on the support carriage 9.

The support carriage 9 has a framework constituted by two main L-section girders 35a, 35b, one of the branches of the L-section extending horizontally and the other branch depending vertically from the end of the horizontal branch adjacent the scooping wheel. The girders 35a and 35b are braced by section members 36.

A product-retaining sheet 37 is fixed between the main girders 35a and 35b adjacent a part of the inner periphery of the scooping wheel 1. This sheet is maintained at its lower end 37a by an extension 38 of the carriage 9 which depends from the lower ends of the vertical branches of the main girders 35a and 35b.

A hopper 39 is arranged in the upper part of the apparatus to guide the product conveyed upwardly by the scoops 5 and deposit this product on a suitable conveyor means 40, as a conveyor belt, adapted to discharge the product for a subsequent treatment thereof. Preferred embodiments of this conveyor means will be described in detail hereinafter.

The support carriage 9 is movable along two horizontally-extending box structure girders 41a and 41b supported at their ends. Their length may be as much as, for example, 50 metres. These girders together constitute a horizontal framework or gantry having a longitudinal axis P—P (FIG. 2).

Figure 5:
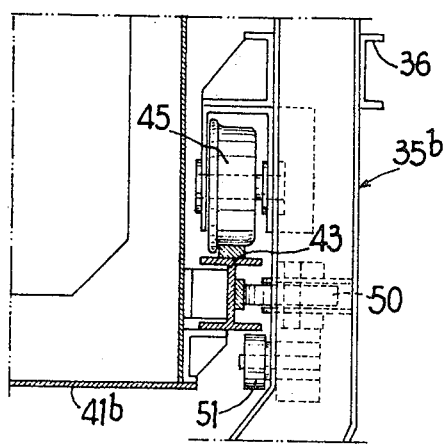
FIG. 5 is an elevational view, partly in section, of a detail of the carriage supporting the scooping wheel according to the invention.

The girders 41a and 41b may be braced in regions spaced apart equal distances and carry the conveyor belt 40 and two guide rails 42 and 43 (FIGS. 1 and 5). The latter are adapted to guide the support carriage 9 through pairs of upper rollers 44 and pairs of lower rollers 45.

The girders 41a and 41b are also provided with two racks 46a and 46b mounted on the upper surfaces of the girders and adapted to drive the carriage 9 along these upper surfaces by means of a horizontal shaft 47 carrying two gear pinions 48, meshing with the racks 46a and 46b, and a motor-speed reducer unit 49 mounted on the carriage 9. This unit may be of the electric, hydraulic or other type.

Other means for driving the carriage 9, as a chain sprocket or sprockets cooperating with one or two chains extending above the girders 41a and 41b, may also be provided.

Rollers 50 whose axes are perpendicular to the axes of the rollers 44 roll laterally along the rail 43, and rollers 51, also in contact with this rail, prevent an accidental raising of the carriage 9 off these runways.

FIG. 7 is a diagrammatic plan view of the assembly of an apparatus according to the invention. This apparatus comprises a gantry 62 which is movable in translation along two parallel rails 63a and 63b suitably secured to the ground so that the gantry 62 is capable of serving the entire area of a region E in which a heap of product must be stocked or stored. Mounted on the gantry 52 is a conveyor device 40 which extends throughout the length of the gantry and communicates with a product supply device 64 and with a product discharging device 65, these two devices being preferably constituted by conveyors which extend, for example, along the sides of the apparatus.

The stock comprises two separate parts $S_1$ and $S_2$ but it must be understood that it may be constituted by a single heap or more than two heaps of product if desired.

A rotary scooping wheel 1 is mounted on the gantry 62 and is movable in translation so as to be capable of pouring or tipping the product onto the conveyor device 40 at any point. This wheel 1 is that described hereinbefore.

Figure 8A:
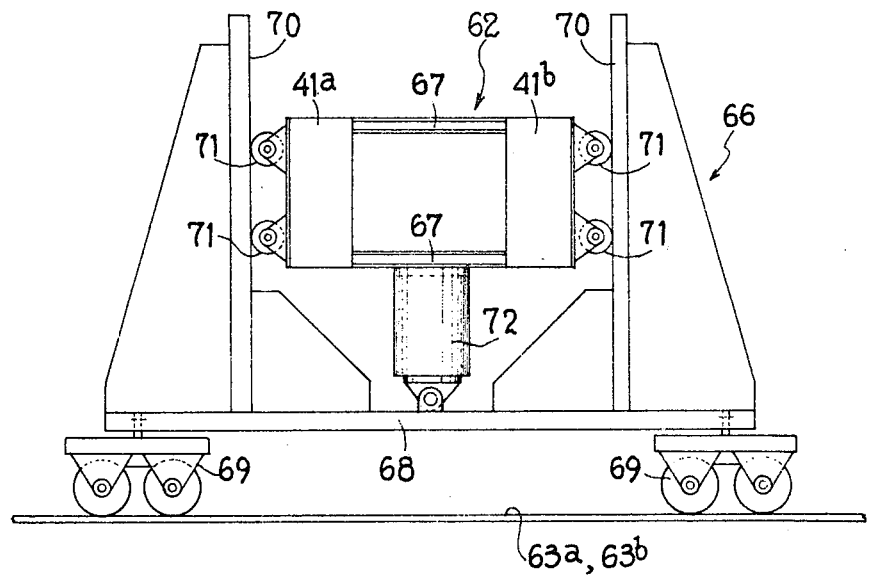
FIGS. 8A and 8B show a movable lateral leg of the gantry shown in FIG. 7 respectively in the lower and upper positions of the leg.
Figure 8B:
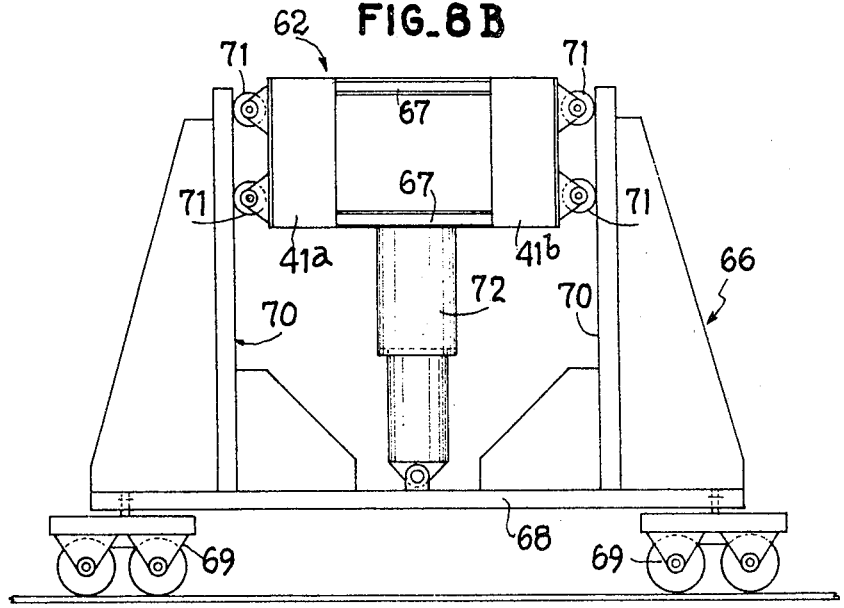

As previously described, the framework 62 comprises two girders 41a and 42b which are supported at each end by leg structures 66 of identical construction, as shown in FIGS. 8A and 8B. In the latter, one of the leg structures 66 supporting the horizontal framework 62 is illustrated. It can be seen that the girders 41a and 41b are braced by cross-members 67. Each leg structure 66 includes a chassis 68 mounted on bogies 69 which run along the rails 63A or 63B.

Vertical guideways 70 are mounted on the chassis 68 and cooperate with rollers 71 which are mounted laterally adjacent each end of the girders 41a and 41b. With this arrangement, the whole of the horizontal framework 62 is vertically movable along the guideways or rails 70 under the action of a cylinder device or ram 72 which has a vertical axis and is provided in each leg structure 66 and bears against the corresponding chassis 68 and lower cross-member 67.

In FIG. 8A, the horizontal framework is shown in its lower position, the device 72 being in its withdrawn position whereas FIG. 8B shows the horizontal framework in its uppermost position in which the cylinder device 72 is fully extended.

In FIGS. 1 and 6 in particular, it can be seen that, in accordance with an essential feature of the invention, the axis X—X of the wheel 1 is offset with respect to the axis P—P of the framework 72 constituted by the girders 41a and 41b. Moreover, it can be seen that, in cross section, the framework 62 is inscribed in a rectangle located in the upper part of the wheel.

Consequently, when the wheel 1 is positioned at one of the ends of the framework 62, the latter can be moved over and above the region E of the stock $S_1$, $S_2$, even if the latter reaches a height $h_A$ (FIGS. 1 and 6) whereas in known arrangements in which the horizontal framework occupies the whole of the section of the wheel, it is necessary to limit the height of the stock to the value $h_B$, which is only practically one third of the height $h_A$ of the stock that it is possible to obtain with an apparatus according to the invention.

Consequently, even with an apparatus in which the horizontal framework is not mounted on telescopic leg structures arranged in accordance with the structure shown in FIGS. 8A and 8B, there is already obtained the considerable advantage of the possibility of shifting the framework over a stock which has a height normal in apparatus of this type, which was not the case of prior methods. Indeed, in the known apparatus for passage of the framework is blocked by the front face of the stock unless there is envisaged a stock height which is practically devoid of interest.

It will be understood that the arrangement shown in FIGS. 8A and 8B enables the essential feature of the invention to be exploited with still further effectiveness. Indeed, in this case it is possible to effect the scooping in two scooping passes or planes of the horizontal framework above the region of the stock, the maximum height of the stock being then increased by the extent to which the cylinder devices 72 extend.

FIGS. 6A and 9A to 9E illustrate another feature of the invention whereby it is possible not only to scoop product from the stock with the aid of the scooping wheel 1 but also to pour or tip the product onto the stock by means of the conveyor device 40 already described with respect to FIG. 1.

FIGS. 6 and 9A to 9E show that the conveyor device 40 of the horizontal framework 62 is constituted by two endless conveyors 73 and 74 mounted on elongated chassis 75 and 76 which are movable, in the horizontal plane and in the direction of the length of the conveyors, along rails 77 through rollers 78 provided along the conveyors. These rails are fixed to confronting surfaces of the girders 41a and 41b. Owing to the provision of drive means (not shown), the endless conveyors 73 and 74 are movable along the girders 41a and 41b so as to be capable of serving the entire area of the region E.

The conveyor 72 has an extent which must be at least one half of the total length of the girders 41a and 41b so that, for any mutual positions of the two conveyors, at least a part of the upper conveyor 73 is located over or overlaps the lower conveyor 74. Thus the upper conveyor 73 is always able to pour product onto the lower conveyor 74. The latter has a length slightly greater than one half of the width $l$ of the roof or top surface of the stock.

Further, in order to ensure the supply of product by the conveyors 74 to the upper conveyor 73, the latter must be arranged in such manner that one of its ends be capable of receiving the product from the conveyor 64. Further, the lower conveyor 74 must be arranged in such manner that it is capable of pouring product onto the discharging conveyor 65.

For this purpose, the girders 41a and 41b are in slightly overhanging relation with one of the leg structures 66.

The mutual positions of the conveyors 73 and 74 and scooping wheel 1, when the stock is being supplied with product, have been shown diagrammatically in FIG. 9A. The product supplied by the conveyor 64 is poured onto the conveyor 73 whose upper side moves in the direction of arrow $f_1$.

In the course of this operation, the conveyor 73 remains bodily fixed in position with respect to the girders 41a and 41b as it pours the product onto the conveyor 74. The latter, in contradistinction to the conveyor 73, is shifted along the girders 41a and 41b so as to be capable of sweeping over the whole of the width of the region E. For this purpose, it is placed at the right end of the girders 41a and 41b and shifted progressively to the left as the stock $S_1$ is being formed, the direction of movement of the upper side of the conveyor 74 being that of arrow $f_2$.

When the right end of the conveyor 74 reaches a point midway of the width of the stock, its direction of operation is reversed (arrow $f_3$) and the conveyor 74, which at this instant is located below the conveyor 73, is displaced once more to the right. Thus, the other half of the stock may be formed. It will be understood that this product supply operation is carried out while the scooping wheel 1 is parked to one side of the stock, as shown in FIG. 9A. Further, it is carried out by successive passes or travels across the width of the stock by the displacement of the gantry along its rails 63a and 63b.

FIG. 9B shows how it is possible to take product from the stock.

The scooping wheel 1 is then displaced along the girders 41a and 41b by means of the support carriage 9, the conveyor 74 remaining fixed in its illustrated position, that is to say, at the left.

On the other hand, the conveyor 73 is shifted in such manner that the product scooped up by the wheel 1 falls first onto this conveyor 73 which then pours the product onto the conveyor 74. In other words, with reference to FIG. 9B, the conveyor 73 may remain fixed while the wheel 1 moves along the conveyor, but as soon as the wheel reaches the inner end of the conveyor 73 above the conveyor 74, the conveyor 73 accompanies the wheel 1 until the end of the considered travel across the stock so as to act as an intermediate means between the wheel 1 and the conveyor 74.

In this way an excessively high drop of the product from the scooping wheel 1 onto the lower conveyor 74 is avoided. The conveyor 74 in both cases pours the product onto the discharging conveyor 65, as illustrated. In the course of this operation, the successive scooping travels or passes are effected by shifting the gantry along the rails 63a and 63b.

FIGS. 9A and 9B show the girders 41a and 41b in their lower position, that is to say, with the cylinder devices 72 withdrawn, which determines a certain minimum height $h_1$ of the stock. FIG. 9C shows the upper position of the girders 41a and 41b, which corresponds to a maximum height $h_2$ of the stock, the scooping wheel 1 being positioned at a certain height from the ground. To withdraw product from the stock, the gantry is thereafter placed in front of the stock and the girders 41a, 41b are lowered to their lower position so that the wheel 1 once more touches the ground (FIG. 9D).

FIG. 9E shows that the product discharge conveyor 65 may be placed on the opposite side of the girders 41a and 41b as shown in FIG. 7. Under these conditions, the corresponding end of the lower conveyor 74 must be capable of being positioned to permit the discharge of the product onto this conveyor.

Note that the product supply conveyor 64 must in any case be capable of pouring the product at any place along the edge of the region E which is possible to achieve in the known manner, for example by rendering the conveyor 64 movable in the direction of the length, or by providing therein a pouring carriage which is movable along the conveyor.

FIG. 10 shows that the invention is not limited to a rectangular or square shape of the stock or stocks. In the apparatus shown diagrammatically in this Figure, the stock $S_3$ has a circular shape and the apparatus comprises a gantry 79 whose horizontal framework has one end mounted on a pivot 80 constituting the centre of the stock $S_3$ and its opposite end bearing on a leg structure 81 which is preferably of identical or similar form to the leg structure 66 shown in FIGS. 8A and 8B.

This apparatus also comprises a scooping wheel 82 mounted on a support carriage of identical form to the support carriage shown in FIGS. 1 and 6.

Also provided are a product supply or feed conveyor 83 and a product discharge conveyor 84 which lead to the centre of the apparatus.

Figure 11:
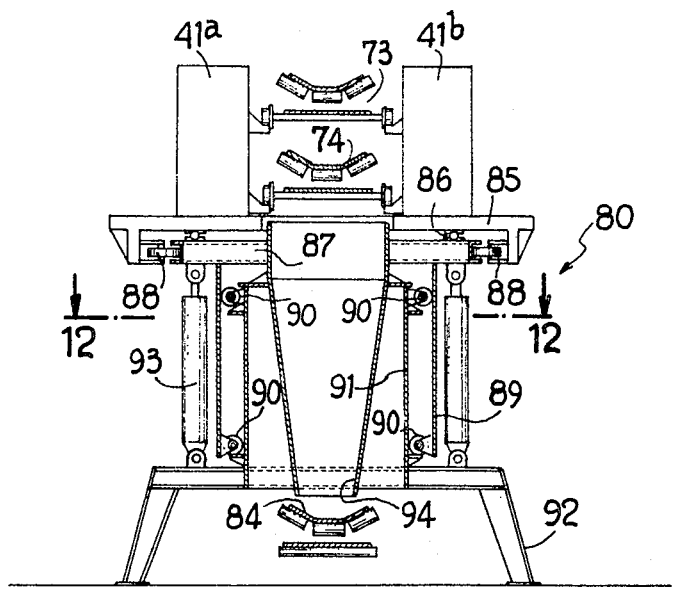
FIGS. 11 and 12 are diagrammatic views, respectively in elevation and in horizontal section, of a device constituting a pivot employed for supporting one end of a horizontal framework of the gantry employed in the apparatus shown in FIG. 10.
Figure 12:
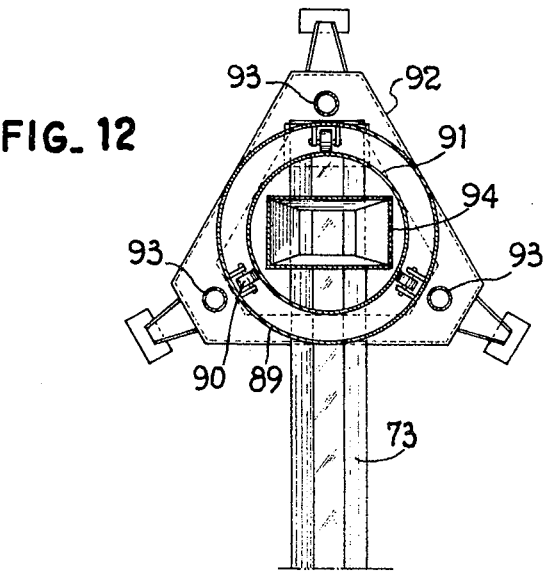

A preferred embodiment of the centre pivot 80 of the apparatus shown in FIG. 10 is shown in FIGS. 11 and 12. Note that the horizontal framework is identical to that already described hereinbelow.

One of the ends of each girder 41a or 41b is secured to a platform 85 having a generally circular shape and mounted to be rotatable about a vertical axis which is the axis of the pivot 80. The platform 85 bears through a ring 86 on a circular chassis 87 and is guided on the latter by rollers 88 which have vertical axes and move along a runway provided on the periphery of the chassis 87.

A cylindrical skirt 89, coaxial with the axis of the pivot 80, is secured to the chassis 87 and extends downwardly, its lower edge being provided with guide rollers 90 which are angularly spaced apart 120° and extend inwardly. These rollers roll along a guide cylinder 91 which is integral with a stand 92 embedded in the ground.

Three cylinder devices 93 having a vertical axis are disposed around the cylindrical skirt 99 between the stand 92 and the chassis 87 for shifting the moving part of the pivot 80 vertically.

A hopper 94 is mounted at the centre of this pivot so as to be capable of receiving product from the conveyor 74 for pouring it onto the discharge conveyor 84.

FIGS. 13 to 15 and 16A to 16C show a modification of the apparatus according to the invention comprising a conveyor device 95 which differs from the corresponding conveyor devices of the foregoing embodiments.

Figure 14:
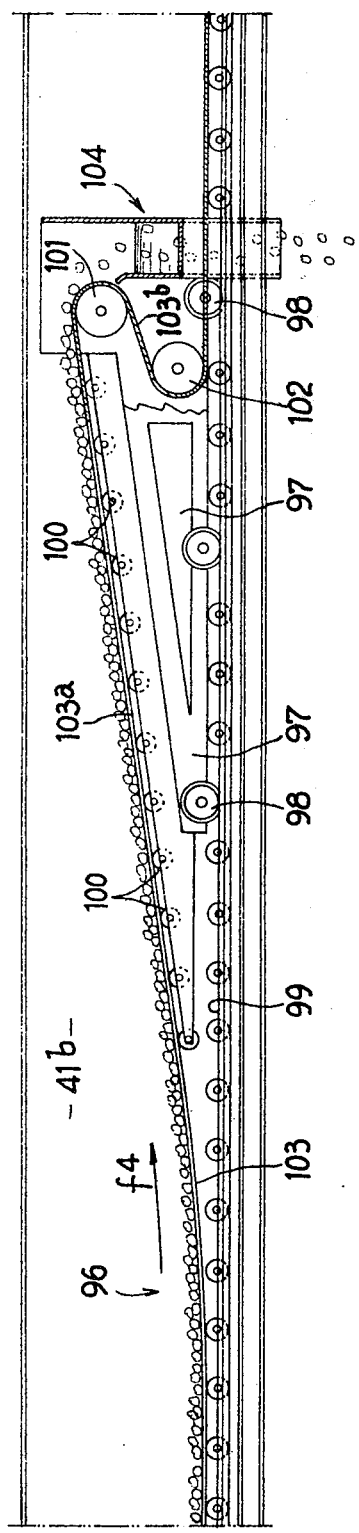
FIG. 14 is a side elevational view, to an enlarged scale, of a part of the apparatus shown in FIG. 13.
Figure 15:
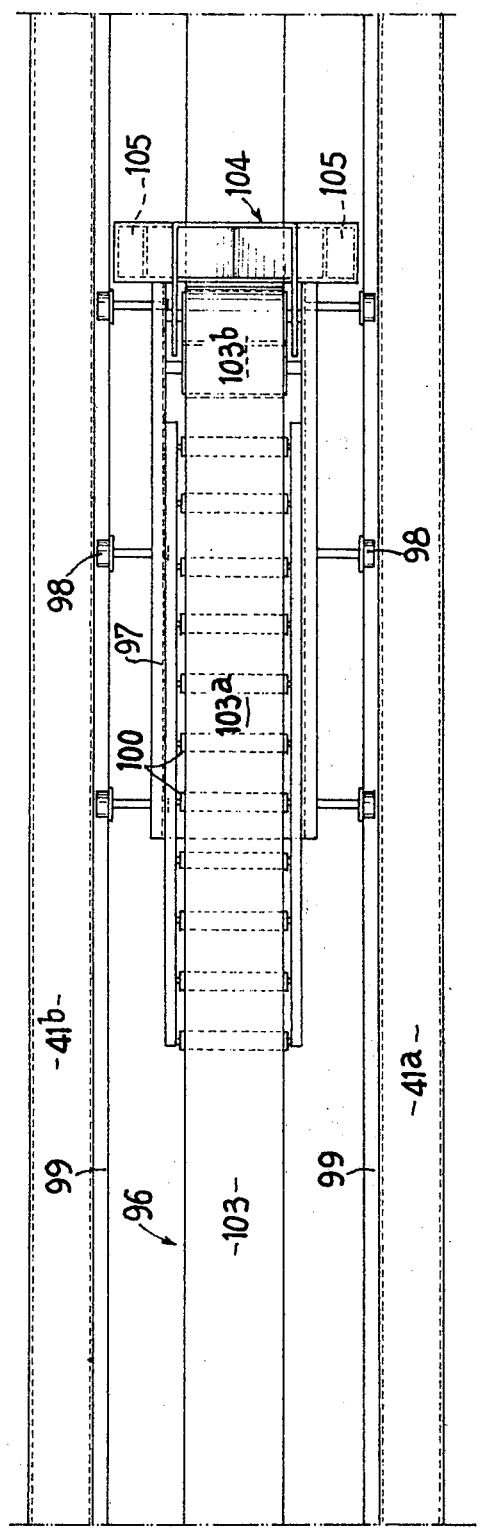
FIG. 15 is a plan view of the part of the apparatus shown in FIG. 14.

The conveyor device 95 comprises a single conveyor 96 in which is inserted a pouring carriage (see FIGS. 14 and 15). The latter comprises a chassis 97 provided with lateral rollers 98 which have horizontal axes and are capable of rolling along rails 99 integral with the girders 41a and 41b. The chassis 97 has guide rollers 100 to 102 for an endless belt 103 pertaining to the conveyor 96 and mounted horizontally in the chassis 97 of the carriage. The rollers 100 are mounted to have progressively increasing heights so that they impart a slope to the part 103a of the endless belt 103.

The rollers 101 and 102 define an S-shaped path for the part 103b of the belt 103 which follows on the inclined part 103a. At the end of this slope, there is mounted a double hopper 104 whose outlets 105 are disposed on each side of the conveyor on the side of the S-shaped part 103b opposed to the part 103a.

With this arrangement, the product deposited on the belt 103, when supplying product to the stock, is discharged in to the double hopper 104 and poured onto the stock. In this case, the belt travels in the direction of arrow $f_4$.

The pouring carriage is provided with suitable known drive means (not shown) to shift it along the horizontal framework 41a, 41b.

FIGS. 16A and 16B show that the apparatus according to this modification comprises a product supply conveyor 64 capable of pouring product onto the belt 103 and a product discharge conveyor 65. A scooping wheel 1 with its accessories is of course provided.

To supply product to the stock S₄, the wheel 1 is parked to one side and the carriage 97 is moved over and above the stock (FIG. 16A) which is constituted after a number of passages or travels between which the gantry 41a, 41b is displaced. The conveyor 96 travels in the direction of arrow $f_4$. To remove product from the stock S₄ (FIG. 16B), the direction of travel of the conveyor 96 is reversed (arrow $f_5$), the carriage 97 is parked on the right side and the scooping wheel 1 is moved along the gantry 41a, 41b, a certain number of passages or travels of the wheel 1 being necessary to remove the whole of the stock.

FIG. 16C shows that the conveyor 65 can also be mounted on the side opposed to the conveyor 64, in which case, for the purpose of removing product from the stock, the pouring carriage 97 is parked on the left side of the apparatus. Thus the conveyor 96 can have only a single direction of travel.

Having now described my invention, what I claim as new and desire to secure by Letters Patent is:

1. An apparatus for serving a heaped stock of product comprising a gantry having an elongated substantially horizontal framework, the cross-section of which is inscribed in a rectangle, a carriage mounted on the framework so as to undergo a substantially horizontal translational movement along said framework, said carriage having the general shape of an inverted L the limbs of which extend respectively in directions parallel to the large side and the small side of said rectangle, an annular scooping wheel extending around said framework in a substantially vertical plane and mounted on the carriage to rotate in said vertical plane about an axis parallel to said framework, the axis of rotation of the wheel being located under the lower large side of said rectangle, said L-shaped carriage having a vertical limb of the L located adjacent a region of said wheel which scoops the product, said apparatus further comprising two suspension means for rotatably mounting said wheel on said carriage, said suspension means being located respectively in the vicinity of the free ends of said limbs.

2. An apparatus as claimed in claim 1, wherein said framework comprises two spaced elongate girders which are each in the form of a box structure and are, in section, respectively located adjacent the small sides of said rectangle.

3. An apparatus as claimed in claim 2, comprising means for supplying product to the stock, means for discharging the product of the stock and conveyor means mounted between said girders and communicating with said product supply means and said product discharge means.

4. An apparatus as claimed in claim 3, wherein said conveyor means comprise two endless conveyors having two directions of travel and movably mounted on said framework, one conveyor being disposed above the other, and means associated with each conveyor for moving the associated conveyor longitudinally of said framework throughout the length of said framework.

5. An apparatus as claimed in claim 3, wherein said conveyor means comprise a single endless conveyor and a pouring carriage mounted to be movable along the whole of said framework and capable of pouring the product laterally of said single conveyor.

6. An apparatus as claimed in claim 1, comprising two parallel rails, leg structures extending from the framework and rolling means mounted on the leg structures and rollable along said rails for displacing the gantry.

7. An apparatus as claimed in claim 6, wherein said leg structures are provided with raising means for adjusting the height of said framework.

8. An apparatus as claimed in claim 7, wherein said raising means comprise fluid cylinder devices.

9. An apparatus as claimed in claim 1, comprising centre pivot means and circular rail means concentric with said pivot means, the framework of said gantry having one end pivotably mounted on the centre pivot means and an opposite end on which is mounted a leg structure which is movable along said circular rail.

10. An apparatus as claimed in claim 9, wherein said pivot means and said leg structure are each provided with raising means for adjusting the height of said framework.

11. An apparatus as claimed in claim 10, wherein said raising means comprise fluid cylinder devices.

* * * * *